United States Patent
Sakamaki et al.

(10) Patent No.: US 8,055,410 B2
(45) Date of Patent: Nov. 8, 2011

(54) ELECTRIC POWER STEERING SYSTEM

(75) Inventors: Masahiko Sakamaki, Okazaki (JP); Shigeki Nagase, Nabari (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 1013 days.

(21) Appl. No.: 11/921,279

(22) PCT Filed: May 30, 2006

(86) PCT No.: PCT/JP2006/310773
§ 371 (c)(1),
(2), (4) Date: Nov. 29, 2007

(87) PCT Pub. No.: WO2006/129659
PCT Pub. Date: Dec. 7, 2006

(65) Prior Publication Data
US 2009/0043453 A1    Feb. 12, 2009

(30) Foreign Application Priority Data

May 30, 2005 (JP) ................................ P2005-157933

(51) Int. Cl.
*B62D 6/00* (2006.01)
(52) U.S. Cl. ....................... 701/41; 318/400.2
(58) Field of Classification Search .................... 701/41; 318/400.2, 504, 490, 563, 400.22; 180/446
See application file for complete search history.

(56) References Cited

U.S. PATENT DOCUMENTS

| | | | |
|---|---|---|---|
| 6,326,753 B1 * | 12/2001 | Someya et al. | 318/471 |
| 7,157,874 B2 * | 1/2007 | Nomura et al. | 318/432 |
| 7,164,362 B2 * | 1/2007 | Hiramine et al. | 340/664 |
| 7,188,702 B2 * | 3/2007 | Takagi et al. | 180/446 |

FOREIGN PATENT DOCUMENTS

| | | | |
|---|---|---|---|
| JP | 6-42533 | | 6/1994 |
| JP | 6-233450 | | 8/1994 |
| JP | 6-284777 | | 10/1994 |
| JP | 8-80080 | | 3/1996 |
| JP | 10-167086 | | 6/1998 |
| JP | 2001-122144 | | 5/2001 |
| JP | 2004-106664 | | 4/2004 |
| JP | 2005-51839 | | 2/2005 |
| JP | 2005-051839 | * | 2/2005 |
| JP | 2005-57818 | | 3/2005 |
| JP | 2005-75309 | | 3/2005 |
| JP | 2005-075309 | * | 3/2005 |

* cited by examiner

*Primary Examiner* — Thomas G. Black
*Assistant Examiner* — Marthe Marc-Coleman
(74) *Attorney, Agent, or Firm* — McGinn IP Law Group, PLLC

(57) ABSTRACT

An electric power steering system in which a current command for a brushless DC motor is determined based on a detected steering torque, a voltage to be applied is determined based on a difference between the current command value and a current value flowing to the motor, and steering assist is implemented by applying the voltage so determined to the motor. A rotational angular velocity is computed based on a detected rotor position, and it is determined that the motor is abnormal when a rotational angular velocity determination unit determines that the rotational angular velocity is equal to or less than a predetermined value, a current command value determination unit determines that the current command value is equal to or less than a predetermined value, and a voltage determination unit determines that the voltage applied to the motor falls out of a predetermined voltage range.

7 Claims, 3 Drawing Sheets

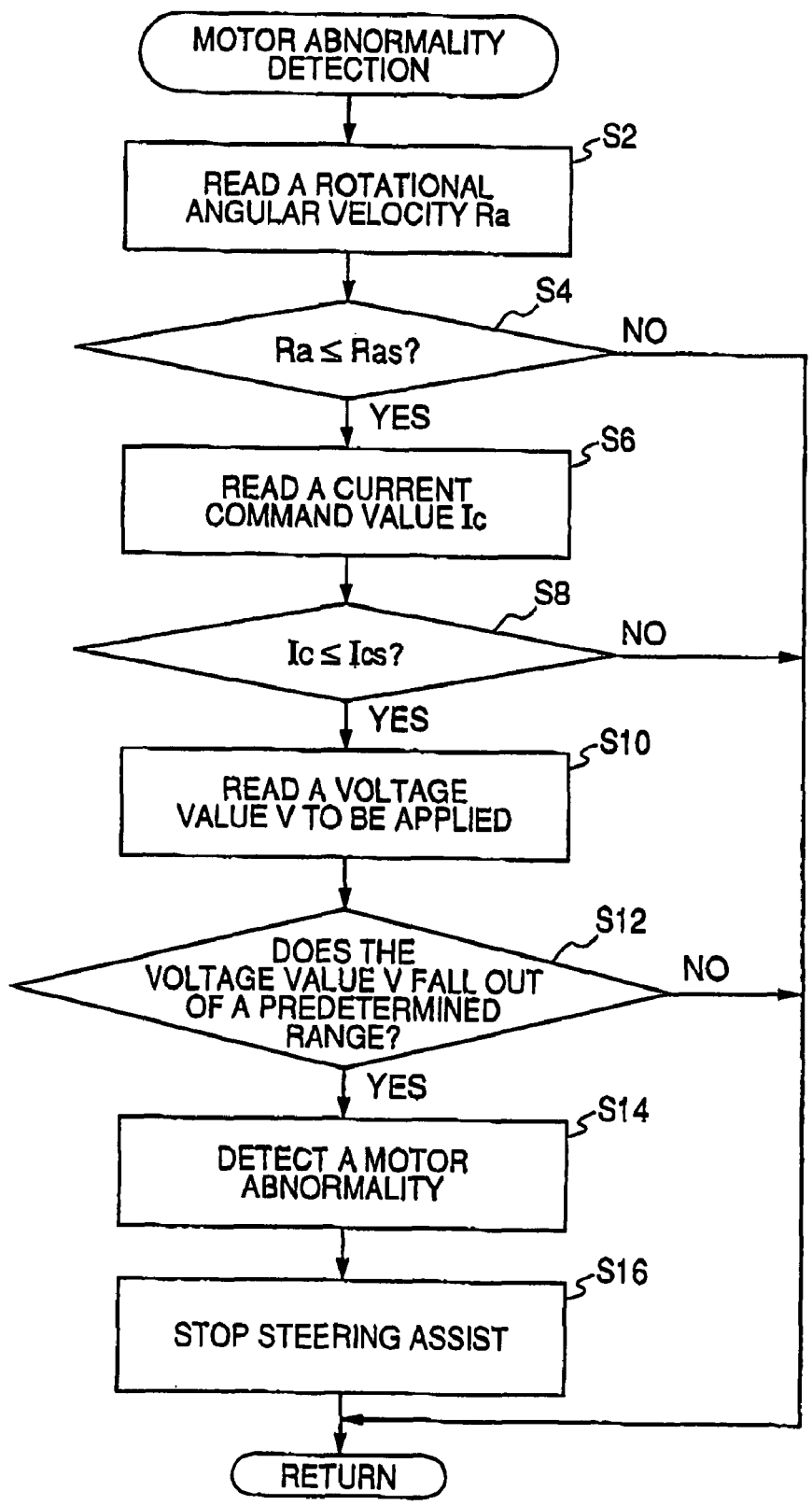

ELECTRIC POWER STEERING SYSTEM

TECHNICAL FIELD

The present invention relates to an electric power steering system which includes a torque detector for detecting a steering torque applied to a steering member to thereby assist in steering by driving a brushless DC motor based on the steering torque detected by the torque detector.

BACKGROUND ART

An electric power steering system which assists in steering by driving a motor to decrease the load on the driver is such as to include an input shaft linked with a steering member (a steering wheel, a hand-operated steering wheel), an output shaft linked with steered road wheels via a pinion and a rack or the like, and a connecting shaft which connects the input shaft with the output shaft, whereby a value of steering torque that is exerted on the input shaft is detected by a torque sensor through an angle or torsion generated in the connecting shaft, so as to drive and control the steering assist motor which is linked with the output shaft based on the steering torque value so detected.

In recent years, in electric power steering systems like this, brushless DC motors have come to be used. In a brushless DC motor, since a current caused to through a stator is PWM (Pulse Width Modulation) controlled so as to generate a rotating magnetic field according to a rotational position of a rotor, a detector is incorporated for detecting a rotor position.

Patent Document No. 1 discloses means for detecting a short circuit failure of a motor and means for breaking a connection when a short circuit failure is detected.

Patent Document No. 2 discloses means for detecting a short circuit and means for cutting power supply to a driving circuit by a fail-safe relay upon detection of the short circuit.

Patent Document No. 3 discloses means for detecting a short circuit failure mode of a motor driving system.

Patent Document No. 4 discloses method for detecting an abnormal operation in a motor driving system.

Patent Document No. 1: JP-A-2004-106664
Patent Document No. 2: JP-U-6-42533
Patent Document No. 3: JP-A-6-233450
Patent Document No. 4: JP-A-10-167086

DISCLOSURE OF THE INVENTION

Problem that the Invention is to Solve

In an electric power steering system which utilizes a brushless DC motor for steering assist, in the event that there occurs a failure in a motor current detection circuit or motor driving circuit, there exists a possibility that the failure results in a serious failure such as locking of a steering shaft. In addition, in the event that an abnormal current such as an eddy current flows in fact, although a failure can be detected by a current detection circuit, in the case of a failure such as the opening of motor terminals or disconnection, since an electric current does not flow in fact, there is caused a problem that the failure cannot be detected by the method of detecting an abnormal current.

The invention was made in view of the situations above, and an object of a first and second invention is to provide an electric power steering system which can detect a failure such as the opening of motor terminals or disconnection which cannot be detected by only the current detection circuit.

An object of a third invention is to provided an electric power steering system which is free from a risk that the occurrence of a failure such as the opening of motor terminals or disconnection results in a serious failure such as locking of a steering shaft.

Means for Solving the Problem

An electric power steering system for assisting in steering by driving a motor according to a first invention is characterized by including:

a rotor position detector for detecting a rotor position of a steering assist brushless DC motor;

a current detector for detecting a current which flows to the motor;

a torque detector for detecting a steering torque applied to a steering member;

a current determination unit for determining a current command value that is to be caused to flow to the motor based on the steering torque detected by the torque detector;

a voltage determination unit for determining a voltage that is to be applied to the motor based on a difference between the current command value determined by the current determination unit and the current value detected by the detected current value;

a driving unit for applying the voltage determined by the voltage determination unit so as to drive the motor;

a computing unit for computing a rotational angular velocity of the motor based on the rotor position detected by the rotor position detector:

a rotational angular velocity determination unit for determining whether or not the rotational angular velocity computed by the computing unit is equal to or less than a predetermined rotational angular velocity;

a current command value determination unit for determining whether or not the current command value is equal to or less than a predetermined current command value;

a voltage determination unit for determining whether or not the voltage falls out of a predetermined voltage range; and a control unit for determining that the motor is abnormal when the rotational angular velocity determination unit determines that the rotational angular velocity computed by the computing unit is equal to or less than the predetermined rotational angular velocity, the current command value determination unit determines that the current command value is equal to or less than the predetermined current command value, and the voltage determination unit determines that the voltage falls out of the predetermined voltage range.

An electric power steering system for assisting in steering by driving a motor according to a second invention is characterized by including:

a rotor position detector for detecting a rotor position of a steering assist brushless DC motor;

a current detector for detecting a current which flows to the motor;

a torque detector for detecting a steering torque applied to a steering member;

a current determination unit for determining a current command value that is to be caused to flow to the motor based on the steering torque detected by the torque detector;

a voltage determination unit for determining a voltage that is to be applied to the motor based on a difference between the current command value determined by the current determination unit and the current value detected by the detected current value;

a driving unit for applying the voltage determined by the voltage determination unit so as to drive the motor:

a computing unit for computing a rotational angular velocity of the motor based on the rotor position detected by the rotor position detector;

a rotational angular velocity determination unit for determining whether or not the rotational angular velocity computed by the computing unit is equal to or less than a predetermined rotational angular velocity;

a current value determination unit for determining whether or not the current value is equal to or less than a predetermined current value:

a voltage determination unit for determining whether or not the voltage falls out of a predetermined voltage range; and a control unit for determining that the motor is abnormal when the rotational angular velocity determination unit determines that the rotational angular velocity computed by the computing unit is equal to or less than the predetermined rotational angular velocity, the current value determination unit determines that the current value is equal to or less than the predetermined current value, and the voltage determination unit determines that the voltage falls out of the predetermined voltage range.

An electric power steering system according to a third invention is an electric power steering system according to Claim 2, characterized in that when the motor is determined to be abnormal, the control unit stops the steering assist by the motor.

An electric power steering system according to a third invention is an electric power steering system according to Claim 2, characterized in that when the motor is determined to be abnormal, the control means stops the steering assist by the motor.

Advantages of the Invention

In the electric power steering system according to the first invention, the computing unit computes a rotational angular velocity of the motor based on the rotor position detected by the rotor position detector, and the rotational angular velocity determination unit determines whether or not the rotational angular velocity so computed is equal to or less than the predetermined rotational angular velocity. The current command value determination unit determines whether or not the current command value is equal to or less than the predetermined current command value, and the voltage determination unit determines whether or not the voltage to be applied falls out of the predetermined voltage range. The motor is determined to be abnormal when the rotational angular velocity determination unit determined that the rotational angular velocity computed by the computing unit is equal to or less than the predetermined rotational angular velocity, the current command value determination unit determines that the current command value is equal to or less than the predetermined current command value, and the voltage determination unit determines that the voltage to be applied falls out of the predetermined voltage range. By this configuration, the electric power steering system can be realized which can detect a failure such as the opening of motor terminals or disconnection which cannot be detected by only the current detector.

In the electric power steering system according to the first invention, the computing unit computes a rotational angular velocity of the motor based on the rotor position detected by the rotor position detector, and the rotational angular velocity determination unit determines whether or not the rotational angular velocity so computed is equal to or less than the predetermined rotational angular velocity. The current value determination unit determines whether or not the current value detected by the current detector is equal to or less than the predetermined current value, and the voltage determination unit determines whether or not the voltage to be applied falls out of the predetermined voltage range. The motor is determined to be abnormal when the rotational angular velocity determination unit determined that the rotational angular velocity computed by the computing unit is equal to or less than the predetermined rotational angular velocity, the current value determination unit determines that the current value detected by the current detector is equal to or less than the predetermined current value, and the voltage determination unit determines that the voltage to be applied falls out of the predetermined voltage range. By this configuration, the electric power steering system can be realized which can detect a failure such as the opening of motor terminals or disconnection which cannot be detected by only the current detector.

According to the electric power steering system according to the third invention, since the steering assist by the motor is stopped when the motor is determined to be abnormal, even though a failure such as the opening of motor terminals or disconnection occurs, the steering wheel can be operated although much effort is needed, whereby the electric power steering system can be realized which is free from a risk that an abnormal current results in a serious problem such as locking of the steering shaft.

BRIEF DESCRIPTION OF THE DRAWINGS

FIG. 3 is a flowchart showing an operation of detecting a motor abnormality in the electric power steering system according to the invention.

BEST MODE FOR CARRYING OUT THE INVENTION

Hereinafter, the invention will be described based on the drawings which show an embodiment thereof.

Figure 1:
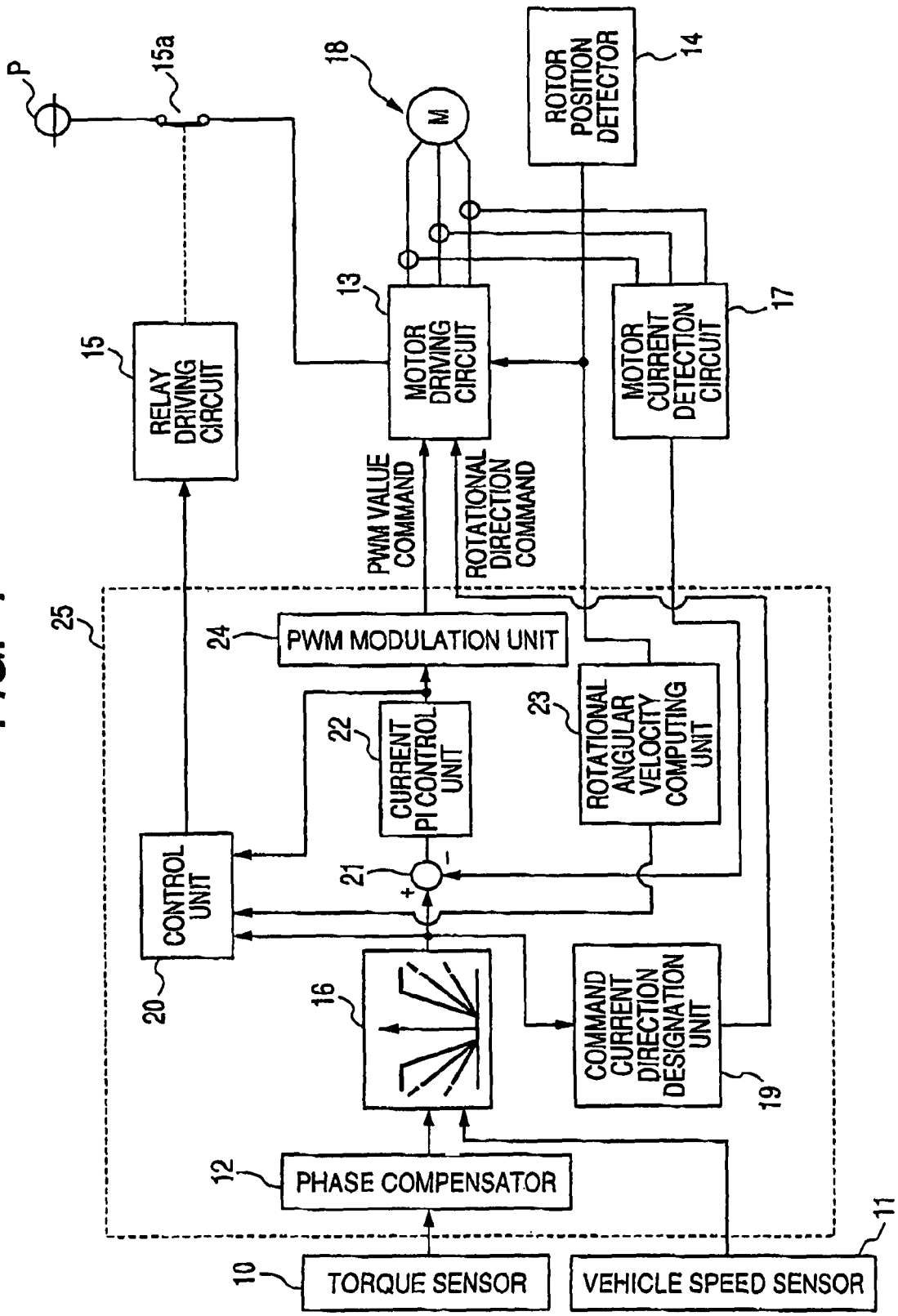
FIG. 1 is a block diagram showing the configuration of an embodiment of an electric power steering system according to the invention.

FIG. 1 is a block diagram showing the configuration of an embodiment of an electric power steering system according to the invention. In this electric power steering system, a steering torque exerted on a steering member, not shown, is detected by a torque sensor (a torque detector) 10, and a steering torque value so detected is given to a phase compensator 12. The steering torque value, which is phase compensated in the phase compensator 12, is given to a torque-current table 16 of an ECU (controller) 25. In addition, a vehicle speed value detected by a vehicle speed sensor is also given to the torque-current table 16.

In the torque-current table 16, a function is set variably in accordance with the vehicle speed value in which in the event that the steering torque value exceeds a predetermined dead band, a target value of a motor current increases proportionally in accordance with an increase in steering torque value, and furthermore, in the event that the steering torque value reaches or exceeds a predetermined value, the target value gets saturated. The function is determined such that as the vehicle speed value increases, a ratio of the target value of the motor current to the steering torque value decreases and the saturated value of the target value decreases. A current command value of the motor current determined by the torque-current table 16 is given to a subtracting unit 21, a command current direction designation unit 19 and a control unit 20.

The current command value of the motor current is a value with a sign which shows a target value in a motor control, and whether to be positive or negative indicates a direction in which steering assist is provided.

The command current direction designation unit 19 creates a rotational direction signal which indicates a direction in which steering assist is to be provided based on a positive or negative sign affixed to the current command value of the motor current given and gives the signal so created to a motor driving circuit 13.

A rotor position detector 14 for detecting a rotor position is incorporated in a motor 18 which is a brushless DC motor for implementing steering assist, and a rotor position signal outputted by the rotor position detector 14 is given to the motor driving circuit 13 and a rotational angular velocity computing unit 23 in the ECU 25. The rotational angular velocity computing unit 23 computes a rotational angular velocity of the motor 18 through a change in the rotor position signal so given and gives the rotational angular velocity so computed to the control unit 20.

A motor current detection circuit (a current detector) 17 detects a current value which is a total of currents which flow through a v-phase field coil, a u-phase field coil and a w-phase field coil of the motor 18, respectively, and gives the current value so detected to the subtracting unit 21 within the ECU 25.

The subtracting unit 21 computes a deviation between the current command value and the current value detected by the motor current detection circuit 17 and gives the deviation so computed to a current PI control unit 22. The current PI control unit 22 computes a voltage value that is to be applied to the motor 18 for PI control based on the deviation so given and gives the voltage value so computed to the control unit 20 and a PWM modulation unit 24.

The PWM modulation unit 24 pulse width modulates the given voltage value and gives the voltage which has been pulse width modulated to the motor driving circuit 13 as a PWM value command signal.

The control unit 20 detects an abnormality in the motor 18 based on the given rotational angular velocity and current command value and the voltage value that is applied to the motor 18, and when detecting an abnormality, the control unit 20 switches off a relay driving circuit 15 and switches off (opens) a relay contact 15a between the motor driving circuit 13 and an on-board battery P.

Note that the torque-current table 16, the subtracting unit 21, the command current direction designation unit 19, the control unit 20, the rotational angular velocity computing unit 23, the current PI control unit 22 and the PWM modulation unit 24 of the ECU 25 are realized by a microcomputer.

Figure 2:
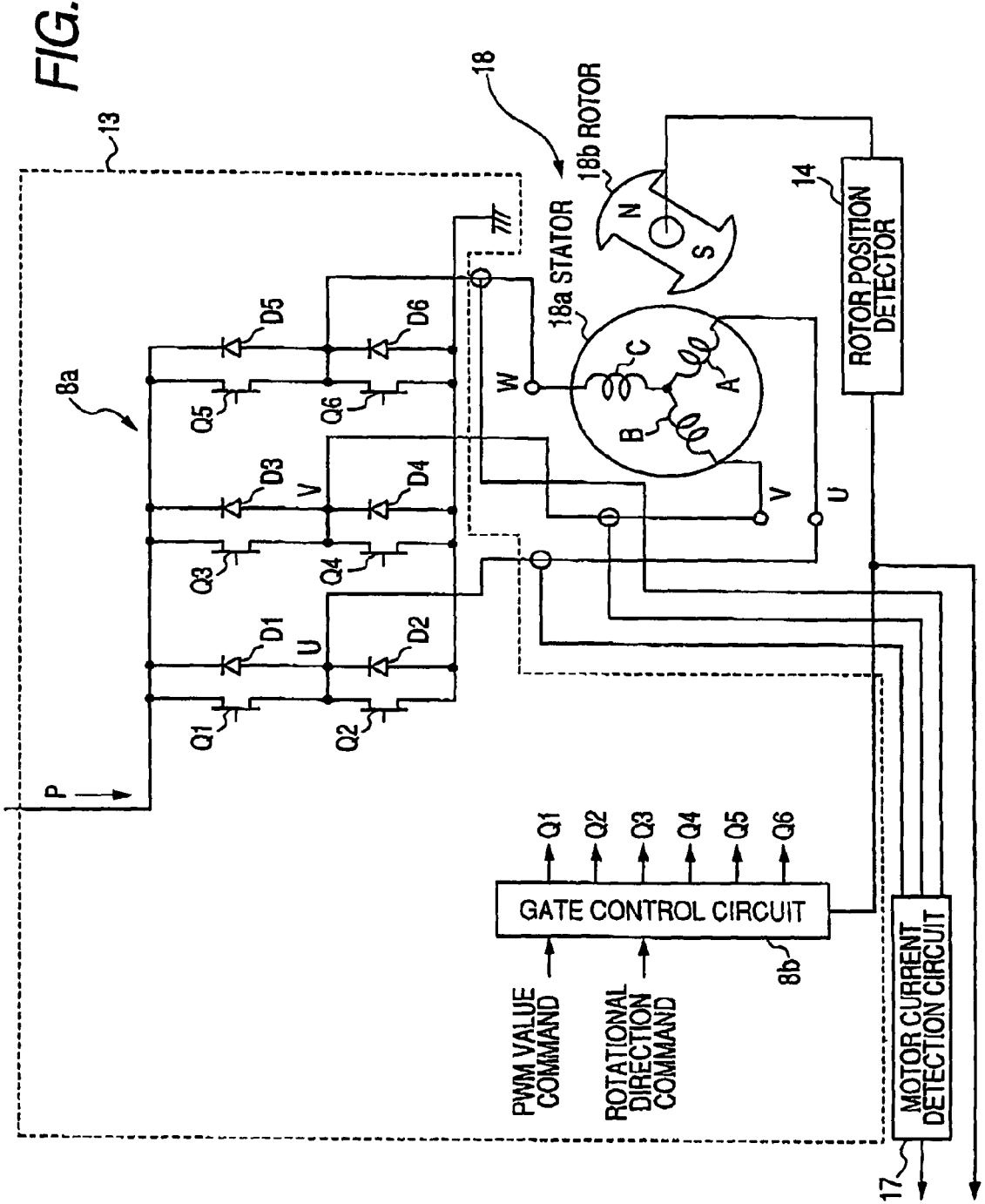
FIG. 2 is a block diagram showing a configuration example of a brushless DC motor, a motor driving circuit and a motor current detection circuit.

FIG. 2 is a block diagram showing an configuration example of the brushless DC motor 18, the motor driving circuit 13 and the motor current detection circuit 17. The brushless DC motor 18 includes a stator 18a (a stator) to which coils A, B, C are start connected, a rotor 18b (a rotor) which is rotated by virtue of a rotating magnetic field that is generated by the coils A, B, C, and the rotor position detector 14.

In the motor driving circuit 13, a supply voltage of the on-board battery P is connected to a positive side terminal of a switching circuit 8a. In the switching circuit 8a, between the positive side terminal and a grounding terminal, series connected transistors Q1, Q2 and diodes D3, D4 which are series connected in an opposite direction are connected in parallel, series connected transistors Q3, Q4 and diodes D3, D4 which are series connected in an opposite direction are connected in parallel, and series connected transistors Q5, Q6 and diodes D5, D6 which are series connected in an opposite direction are connected in parallel.

The other terminal U of the star connected coil A is connected to a common connecting nodal point of the transistors Q1, Q2 and a common connecting nodal point of the diodes D1, D2, the other terminal V of the star connected coil B is connected to a common connecting nodal point of the transistors Q3, Q4 and a common connecting nodal point of the diodes D3, D4, and the other terminal W of the star connected coil C is connected to a common connecting nodal point of the transistors Q5, Q6 and a common connecting nodal point of the diodes D5, D6.

A rotational position of the rotor 18b which is detected by the rotor position detector 14 is informed of as a rotor position signal to a gate control circuit 8b. A PWM value command signal and a rotational direction command signal are given to the gate control circuit 8b from the PWM modulation unit 24 and the command current direction designation unit 19, respectively, of the ECU 25. The gate control circuit 8b switches on/off respective gates of the transistors Q1 to Q6 in response to the rotational direction command signal and the rotor position signal and switches paths of currents which flow to the stator 18a in such a way as U-V, U-W, V-W, V-U, W-U, W-V, and U-V, so as to generate a rotating magnetic field.

The rotor 18b is a permanent magnet and rotates when receiving a rotational force from the rotating magnetic field. The gate control circuit 8b also controls the rotational torque of the brushless-motor 18 to be increased or decreased by PWM (Pulse Width Modulation) controlling the on/off of the transistors Q1 to Q6 in accordance with the current command value.

The diodes D1 to D6 are free-wheeling diodes which protect the transistors Q1 to Q6 and keep the currents which flow to the stator 18a so flowing.

Hereinafter, an operation of detecting a motor abnormality in the electric power steering system that is configured as has been described heretofore will be described by reference to a flowchart in FIG. 3 which illustrates the operation.

In the event that a motor terminals opening failure or disconnection failure occurs, in controlling, although a voltage is attempted to be applied to the motor 18 so that a current value detected by the motor current detection circuit 17 becomes a current command value then, no current flows in reality. Because of this, only the voltage value that is applied to the motor continues to increase (depending upon cases, continues to decrease). Then, when the value of a voltage that is applied to the motor 18 falls out of a predetermined range, it is regarded as an abnormality occurring in the motor 18.

However, in order to avoid an erroneous detection when the motor 18 is in a normal state, conditions are added that the rotational speed (the rotational angular velocity) of the motor 18 is low and that the current command value is also small.

Firstly, the control unit 20 of the ECU 25 reads a rotational angular velocity Ra of the motor 18 from the rotational angular velocity computing unit 23 (S2) and determines whether or not the rotational angular velocity Ra so read is equal to or less than a predetermined rotational angular velocity Ras (S4), and if the rotational angular velocity Ra is not equal to or less than the predetermined rotational velocity Ras (S4NO), the flow returns.

If the rotational angular velocity Ra is equal to or less than the predetermined rotational velocity Ras (S4YES), the control unit 20 reads a current command value Ic of the motor current that is determined by the torque-current table 16 (S6)

and determines whether or not the current command value Ic so read is equal to or less than a predetermined current value Ics (S8). If the current command value Ic so read is not equal to or less than the predetermined current value Ics (S8NO), the flow returns.

If the current command value Ic is equal to or less than the predetermined current value Ics (S8YES), the control unit 20 reads a voltage value V that is computed by the current PI control unit 22 as being applied to the motor 18 (S10) and determines whether or not the voltage value V so read falls out of a predetermined voltage range. If the voltage value V so read does not fall out of the predetermined voltage range (S12NO), the flow returns. Note that the voltage value that is detected by the motor current detection circuit 17 may be used as the base on which whether or not the motor current is equal to or less than the predetermined current value Ics is determined, in place of the current command value.

If the voltage value V falls out of the predetermined voltage range (S12YES), determining that a motor abnormality has been detected (S14), the control unit 20 switches off the relay driving circuit 15 and switches off (opens) the relay contact 15*a*, so as to stop the current supply to the motor driving circuit 13 to thereby stop the steering assist (S16), the flow returning.

By this configuration, the electric power steering system can be realized which can detect the failure such as the opening of motor terminals or disconnection which cannot be detected by only the current detector. In addition, the electric power steering system can be realized which enables the operation of the steering wheel although much effort is needed, thereby making it possible to avoid a risk that the flow of an abnormal current triggers a serious failure such as locking of the steering shaft.

The invention claimed is:

1. An electric power steering system for assisting in steering by driving a motor comprising:
 a rotor position detector for detecting a rotor position of a steering assist brushless DC motor;
 a current detector for detecting a current which flows to the motor;
 a torque detector for detecting a steering torque applied to a steering member;
 current determination means for determining a current command value that is to be caused to flow to the motor based on the steering torque detected by the torque detector;
 voltage determination means for determining a voltage that is to be applied to the motor based on a difference between the current command value determined by the current determination means and the current value detected by the current detector;
 driving means for applying the voltage determined by the voltage determination means so as to drive the motor;
 computing means for computing a rotational angular velocity of the motor based on the rotor position detected by the rotor position detector;
 rotational angular velocity determination means for determining whether or not the rotational angular velocity computed by the computing means is equal to or less than a predetermined rotational angular velocity;
 current command value determination means for determining whether or not the current command value is equal to or less than a predetermined current command value;
 voltage determination means for determining whether or not the voltage falls out of a predetermined voltage range; and
 control means for determining that the motor is abnormal when the rotational angular velocity determination means determines that the rotational angular velocity computed by the computing means is equal to or less than the predetermined rotational angular velocity, the current command value determination means determines that the current command value is equal to or less than the predetermined current command value, and the voltage determination means determines that the voltage falls out of the predetermined voltage range.

2. The electric power steering system according to claim 1, wherein, when the motor is determined to be abnormal, the control means stops the steering assist by the motor.

3. The electric power steering system according to claim 1, wherein the current detector detects a current value comprising a total value of currents which flow through a v-phase field coil of the motor, a u-phase field coil of the motor, and a w-phase field coil of the motor.

4. The electric power steering system according to claim 1, wherein the current detector detects a current value comprising a total value of currents which flow through each phase field coil of the motor.

5. An electric power steering system for assisting in steering by driving a motor comprising:
 a rotor position detector for detecting a rotor position of a steering assist brushless DC motor;
 a current detector for detecting a current which flows to the motor;
 a torque detector for detecting a steering torque applied to a steering member;
 current determination means for determining a current command value that is to be caused to flow to the motor based on the steering torque detected by the torque detector;
 voltage determination means for determining a voltage that is to be applied to the motor based on a difference between the current command value determined by the current determination means and the current value detected by the current detector;
 driving means for applying the voltage determined by the voltage determination means so as to drive the motor;
 computing means for computing a rotational angular velocity of the motor based on the rotor position detected by the rotor position detector;
 rotational angular velocity determination means for determining whether or not the rotational angular velocity computed by the computing means is equal to or less than a predetermined rotational angular velocity;
 current value determination means for determining whether or not the current value is equal to or less than a predetermined current value;
 voltage determination means for determining whether or not the voltage falls out of a predetermined voltage range; and control means for determining that the motor is abnormal when the rotational angular velocity determination means determines that the rotational angular velocity computed by the computing means is equal to or less than the predetermined rotational angular velocity, the current value determination means determines that the current value is equal to or less than the predetermined current value, and the voltage determination means determines that the voltage falls out of the predetermined voltage range.

6. The electric power steering system according to claim 5, wherein, when the motor is determined to be abnormal, the control means stops the steering assist by the motor.

7. The electric power steering system according to claim 5, wherein the current detector detects a cm-rent value comprising a total value of currents which flow through a v-phase field coil of the motor, a u-phase field coil of the motor, and a w-phase field coil of the motor.

* * * * *